United States Patent [19]
Shiblom, Jr. et al.

[11] 3,980,762
[45] Sept. 14, 1976

[54] PRODUCTION OF SINGLET OXYGEN

[75] Inventors: Clifford M. Shiblom, Jr.; Jack P. Guillory, both of Bartlesville, Okla.

[72] Assignee: Phillips Petroleum Company, Bartlesville, Okla.

[22] Filed: Mar. 19, 1975

[21] Appl. No.: 559,890

[52] U.S. Cl. .............................................. 423/579
[51] Int. Cl.² ........................................ C01B 13/00
[58] Field of Search .................................... 423/579

[56] References Cited
UNITED STATES PATENTS
3,681,258  8/1972  Pitzer ................................ 252/437

Primary Examiner—Oscar R. Vertiz
Assistant Examiner—Wayne A. Langel

[57] ABSTRACT

Singlet oxygen is produced by contacting a calcined mixture comprising phosphorus, tin, lithium and oxygen with oxygen.

6 Claims, 1 Drawing Figure

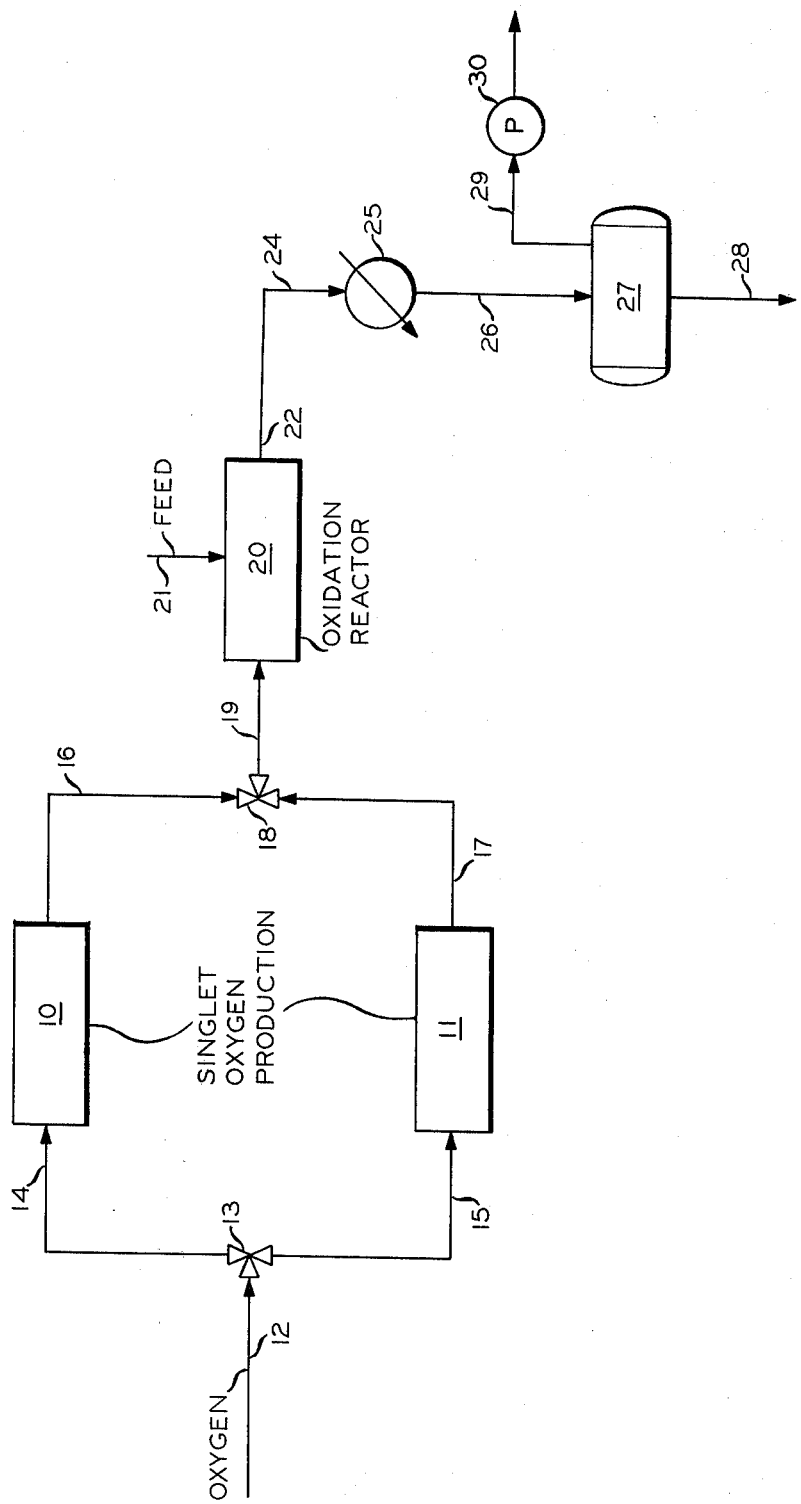

PRODUCTION OF SINGLET OXYGEN

Singlet molecular oxygen, which has an excitation energy of about 23 kcal/mol, can be employed to oxidize materials such as polycyclic aromatic hydrocarbons and olefins containing at least one allylic hydrogen. Examples of such oxidation reactions are described in "Type II Photosensitized Oxidation Reactions", Adv. Chem. Series 77, 78 (1968). Heretofore singlet oxygen has been produced by procedures such as the reaction of alkaline hydrogen peroxide with sodium hypochlorite or bromine, the decomposition of alkaline solutions of peracids, and electrodeless discharges through oxygen.

in accordance with this invention, it has been found that singlet molecular oxygen can be produced by contacting a calcined mixture comprising lithium, tin, phosphorus and oxygen with oxygen at an elevated temperature. The singlet oxygen so produced can be employed to oxidize materials of the type described above, for example.

The accompanying drawing is a schematic representation of an embodiment of apparatus which can be employed to produce singlet oxygen in accordance with this invention and to oxidize chemical compounds by the singlet oxygen so produced.

Referring now to the drawing in detail, two singlet oxygen production reactors 10 and 11 are shown. These reactors can be chambers filled with the calcined material to be described in detail hereinafter. Oxygen is introduced through a conduit 12 which communicates with a three-port valve 13. Although air can be used to supply the oxygen, a relatively pure oxygen stream is preferred. Conduits 14 and 15 extend from valve 13 to respective reactors 10 and 11. When valve 13 is in a first position, the oxygen is directed through conduit 14 to reactor 10. When valve 13 is in a second position, oxygen is directed through conduit 15 to reactor 11. Conduits 16 and 17 extend from the outlets of respective reactors 10 and 11 to a three-port valve 18. A conduit 19 extends from valve 18 to an oxidation reactor 20. Valve 18 selectively connects the outlets of reactors 10 and 11 to reactor 20.

The passage of oxygen over the calcined material in reactors 10 or 11 results in the production of singlet oxygen. This singlet oxygen can be directed to oxidation reactor 20 wherein a chemical compound introduced through conduit 21 is contacted with the singlet oxygen and is oxidized. The outlet of reactor 20 is connected by a conduit 22 to a condenser 25. The outlet of condenser 25 is connected by a conduit 26 to a vapor-liquid separator 27. Condensate is removed from separator 27 through a conduit 28, and uncondensed vapors are removed through a conduit 29 which has a pump 30 therein.

The calcined mixture employed in reactors 10 and 11 comprises phosphorus, tin, lithium and oxygen, wherein the phosphorus is present in the range of about 0.1 to 16 weight percent, tin is present in the range of about 15 to 75 weight percent, lithium is present in the range of about .1 0 10 weight percent, and oxygen is present in sufficient quantity to produce the remainder of the composition. The minimum amount of oxygen is about 15 weight percent. The mixture preferably is formed of $SnO_2$, $P_2O_5$ and $Li_2O$, and can be prepared by coprecipitating phosphorus and tin compounds, aging the wet precipitate, washing, drying, and calcining the resulting material. This material can then be impregnated with a lithium compound and calcined to produce the finished material. As an alternative, the lithium compound can be added before the first calcining step. The material should be calcined at a temperature of at least about 535° C.

Reactors 10 and 11 are normally operated at temperatures in excess of about 550° C. Pump 30 serves to reduce the pressure at the outlets of reactors 10 and 11 and thereby direct the singlet oxygen into reactor 20. This pressure reduction is desirable because the active singlet oxygen tends to be destroyed by collision with oxygen molecules which have not been energized. As will be discussed hereinafter in greater detail, the calcined material employed to generate singlet oxygen has a relatively short useful life. Thus, it is desirable to provide at least two reactors 10 and 11 which can be employed alternately so that fresh material can be introduced into the reactor not in use, and thereby provide a continuous overall process. Polycyclic aromatic hydrocarbons or olefins containing at least one allylic hydrocarbon, for example, can be employed as feed 21 to reactor 20. It is desirable that this oxidation reaction be conducted immediately downstream of singlet oxygen production reactors 10 and 11 because of the relatively short life of singlet oxygen. The relatively low pressure in reactor 20 results in a product which may be at least in part in the vapor state. Condenser 25 is employed to produce a liquid product stream.

EXAMPLE I

A first calcined material, hereinafter designated material No. 1, was prepared based on the following procedure:

A. Dissolve 17.22 pounds (7,818 grams) of $SnCl_4.5H_2O$ in four gallons (15.14 liters) of deionized water plus 100 milliliters of concentrated hydrochloric acid.

B. Add 3.72 pounds (1,689 grams) of 85 percent phosphoric acid to two gallons (7.57 liters) of deionized water.

C. Dissolve one pound (453.6 grams) of ammonium sulfate and seven liters of 58 percent ammonium hydroxide in fifteen gallons (56.78 liters) of deionized water.

Adjust the temperature of A, B and C to 70° F. (21.1° C.) or below.

Charge a reactor with 0.5 pound (227 grams) of ammonium sulfate dissolved in five galons (18.93 liters) of deionized water. Adjust the pH of the reaction mixture to about 3.5 with sulfuric acid or sodium hydroxide as needed and maintain the temperature below 90° F. (32.2° C.).

Mix A and B and feed to the reactor at approximately four and two gallons (15.14 and 7.57 liters) per hour, respectively.

Feed C to the reactor at approximately fifteen gallons (56.78 liters) per hour, the rate being adjusted as needed, to maintain the pH at about 3.5.

Stir the reaction mixture for 1 hour after precipitation is completed, and allow the precipitate to set for 12 to 48 hours. Decant the supernatant liquid, filter, and wash the precipitate with an ammonium sulfate solution containing one pound of ammonium sulfate in ten gallons of deionized water. Repeat this wash step four times. Thereafter, spray dry the precipitate and dry the resulting powder at 600° F. (315.6° C.) for about 3 hours.

Add a tableting lubricant, which can be polyethylene powder, in an amount equivalent to about 3 percent by weight of the dry powder, and mix thoroughly. Tablet the resulting mixture into pellets of ⅛ inch (0.32 cm) diameter and length.

Remove lubricant by passing air over the pellets and heat in accordance with the following schedule:

½ hour to 500° F., then ½ hour at 500° F. (260° C.)
½ hour to 600° F., then ½ hour at 600° F. (315.6° C.)
½ hour to 800° F., then ½ hour at 800° F. (426.7° C.)
½ hour to 900° F., then ½ hour at 900° F. (482.2° C.)
½ hour to 1000° F., then ½ hour at 1000° F. (537.8° C.)
½ hour to 1100° F., then 2 hours at 1100° F. (593.3° C.)

Impregnate the pellets with an aqueous lithium nitrate solution, and calcine by passing air over the pellets while heating in accordance with the folowing schedule:

½ hour to 500° F., then ½ hour at 500° F. (260° C.)
½ hour to 900° F., then ½ hour at 900° F. (482.2° C.)
½ hour to 1250° F., then 4 hours at 1250° F. (676.7° C.)

The composition of the finished calcined material No. 1, based on the total weight of the material, was approximately as follows: 3.2% $Li_2O$ (1.5% Li), 22.9% $P_2O_5$ (10.0% P) and 73.9% $SnO_2$ (58.4% Sn).

A second calcined material, herinafter designated material No. 2, was prepared by a procedure corresponding to the foregoing except as follows:

1. 16.94 Pounds (7,691 grams) $SnCl_4.5H_2O$ is employed in step (A).
2. The precipitate is dried by passing air over the powder and increasing the temperature to 250° F. (121.1° C.) in ¼ hour, holding at 250° F. (121.1° C.) for 3 hours, increasing to 800° F. (426.7° C.) in 2 hours, and holding at 800° F. (426.7° C.) for 2 hours.
3. The dried precipitate is impregnated with an aqueous solution of lithium nitrate and calcined by passing air over the powder and increasing the temperature to 300° F. (148.9° C.) in 2 hours, holding at 300° F. (148.9° C.) for 2 hours, increasing to 1250° F. (676.7° C.) in 3 hours, and holding at 1250° F. (676.7° C.) for 2 hours.
4. The resulting powder is ground so that greater than 95% is smaller than 270 mesh (U.S. Standard sieve). This ground powder is formed into a paste by adding water in an amount equal to about ¼ the weight of the powder. The paste is dried at a temperature in the range of 600–1250° F. (315.6–676.7° C.), and ground to the range of 16 to 100 mesh.
5. The powder of step (4) is formed into pellets of 0.11 to 0.13 inch (0.28 to 0.33 cm) in length and 0.25 inch (0.64 cm) in diameter by use of a lubricant as previously described, except that 2 percent lubricant is employed. The lubricant is removed by the above-described heating procedure up to 1100° F. (593.3° C.). The powder is held at 1100° F. (593.3° C.) for ½ hour, increased to 1250° F. (676.7° C.) in ½ hour, and held at 1250° F. (676.7° C.) for 2 hours.

The composition, weight percent, of the finished calcined material No. 2 was approximately as follows: 4.3% $Li_2O$ (2% Li), 22.9% $P_2O_5$ (10.0% P) and 72.8% $SnO_2$ (57.5% Sn).

A series of runs was conducted in which singlet oxygen was produced by passing a stream of oxygen over materials No. 1 and No. 2. These runs were conducted in a quartz tube containing approximately 2 grams of the calcined material of 8 to 14 mesh. An equal volume of 6 to 8 mesh quartz chips was placed at the inlet of the catalyst bed to serve as a gas preheater. Oxygen was introduced at a flow rate of 200 cc/min., except as hereinafter noted, and at a pressure of about one atmosphere. The pressure downstream from the catalyst bed was maintained at approximately 4 torr to minimize collisional deactivation of singlet oxygen in the gas stream. The quartz tube was heated by means of an external sand bath which was raised into contact with the tube, with the catalyst being allowed to equilibrate for about 10 minutes.

A portion of the effluent stream from the quartz tube was passed into a vessel containing rubrene (5,6,11,12-tetraphenylnaphthalene). Rubrene is known to react with singlet oxygen and thereby be converted to the colorless endoperoxide. This change in color was measured photometrically. Bromobenzene was employed as a solvent for the rubrene in runs of short duration, less than 10 minutes, and hexadecane was employed in longer runs. Approximately 10 cubic centimeters of 1.5 $\times 10^{-4}$ M rubrene in the solvent was employed. The rubrene absorption spectrum was measured from 400 to 600 nm with a spectrophotometer. The conversion of rubrene to its endoperoxide was determined from the decrease in the absorption maximum at 525 nm.

The results of a first set of runs were as follows:

| Run No. | Material | Temperature (°C.) | % Rubrene Converted/60 min. |
|---|---|---|---|
| 1 | 1 | 650 | 27.6 |
| 2 | 1 | 650 | 27.8 |
| 3 | 1 | 650 | 26.7 |
| 4 | 2 | 650 | 59.2 |
| 5 | 2 | 650 | 52.2 |
| 6 | 2 | 650 | 34.8 |
| 7 | 2 | 650 | 18.2 |
| 8[a] | 2 | 650[a] | 44.6 |

[a]Oxygen flow rate was 100 cc/min.

(a) Oxygen flow rate was 100 cc/min.

These runs demonstrate that singlet oxygen was produced.

Additional runs using material No. 2 were conducted at 650°C. to determine singlet oxygen production as a function of time. The results were as follows:

| Run No. | % Rubrene Converted/hr. | | | |
|---|---|---|---|---|
| | First Hour | Second Hour | Third Hour | After 15 Hours |
| 9 | 52.2 | 24.8 | 9.9 | 0 |
| 10 | 34.8 | 1.2 | — | — |

These runs demonstrate that the effectiveness of the material decreases as a function of time.

Additional runs using material No. 2 were conducted to determine the effect of temperature. The results were as follows:

| Run No. | Temperature (°C.) | % Rubrene Converted/60 min. |
|---|---|---|
| 11 | 300 | 0 |
| 12 | 500 | 0 |
| 13 | 550 | 1.0 |
| 14 | 550 | 0 |
| 15 | 600 | 2.6 |
| 16 | 600 | 10.0 |
| 17 | 600 | 1.9 |
| 18 | 650 | 18.2 |
| 19 | 700 | 75.5 |

These runs demonstrate that a temperature of about 550° C. was required, and that increased singlet oxygen production occurs at higher temperatures.

In another embodiment of this invention, the singlet oxygen is produced in direct contact with the material that is to be oxidized by the singlet oxygen. This can be accomplished, for example, by introducing the calcined material and oxygen directly into reactor 20 to produce singlet oxygen in direct contact with feed material 21. The following example demonstrates that singlet oxygen can be generated by such a procedure.

EXAMPLE II

Two gram portions of fresh and used (as an oxidative dehydrogenation catalyst) material No. 2 were placed in separate quartz test tubes and heated in a sand bath to 650° C. in air at atmospheric pressure. Each of the materials was then immediately dropped into a metal foil-wrapped flask containing 5 cc of spectro grade cetane (n-hexadecane) solution containing rubrene at a molar concentration of $1.5 \times 10^{-4}$, after which the flasks were stoppered. Each flask was left undisturbed for 1 hour. Samples were then analyzed with a Cary Model 14 spectrophotometer by measuring absorbance at 525 millimicrons. The amount of rubrene which reacted with and was decolorized by the singlet oxygen produced is considered to provide an indication of the amount of singlet oxygen produced. The results are as follows:

| Solution | Absorbance Units at 525 M$\mu$ | Rubrene Conversion % |
|---|---|---|
| Original | 1.60 | — |
| Blank, no material | 1.59 | 0.6 |
| Fresh material | 1.06 | 33.7 |
| Used material | 1.11 | 30.6 |

The results show that the material produces singlet oxygen when it is dropped hot into hydrocarbon solutions of rubrene in the presence of air contained in the flask.

In a similar one-hour test made with fresh and used samples of unheated material No. 2 by dropping each sample into rubrene solutions contained in foil-wrapped flasks at room temperature, which were then stoppered and shaken briefly every 15 minutes, it was found that no conversion of rubrene had taken place.

In a final test, unheated material No. 2 placed in a foil-wrapped flask containing the rubrene solution was not stoppered and left undisturbed for two hours. It was found that a conversion of 4.7% of the rubrene had taken place. These results indicate that the material forms a small amount of singlet oxygen if the solution containing it is exposed to air for a relatively long period of time.

While this invention has been described in conjunction with presently preferred embodiments, it obviously is not limited thereto.

What is claimed is:

1. The method of producing singlet oxygen which consists of contacting in a reactor oxygen with a calcined mixture comprising tin, phosphorus, lithium and oxygen, the tin comprising 15–75 weight percent of the mixture, the phosphorus comprising 0.1 to 16 weight percent of the mixture, the lithium comprising 0.1 to 10 weight percent of the mixture and the oxygen comprising at least 15 weight percent of the mixture, the temperature of said reactor being greater than about 550° C.; and recovering from the reactor the singlet oxygen so produced.

2. The method of claim 1 wherein the mixture is formed of $SnO_2$, $P_2O_5$ and $Li_2O$.

3. The method of claim 1 wherein tin comprises about 58.4 weight percent of the mixture, phosphorus comprises about 10 weight percent of the mixture, lithium comprises about 1.5 weight percent of the mixture and oxygen comprises about 30.1 weight percent of the mixture.

4. The method of claim 1 wherein tin comprises about 57.5 weight percent of the mixture, phosphorus comprises about 10 weight percent of the mixture, lithium comprises about 2 weight percent of the mixture and oxygen comprises about 30.5 weight percent of the mixture.

5. The method of claim 1 wherein the pressure in said reactor is less than atmospheric.

6. The method of claim 1 wherein said calcined mixture is positioned within said reactor, said oxygen is introduced into said reactor at a pressure of about one atmosphere, and the singlet oxygen is recovered through a product removal means maintained at a pressure of approximately 4 torr.

* * * * *